(12) United States Patent
Yuan et al.

(10) Patent No.: US 12,591,462 B2
(45) Date of Patent: Mar. 31, 2026

(54) INFERENCE SERVICE DEPLOYMENT METHOD, DEVICE, AND STORAGE MEDIUM

(71) Applicant: Beijing Baidu Netcom Science Technology Co., Ltd., Beijing (CN)

(72) Inventors: Zhengxiong Yuan, Beijing (CN); Zhenfang Chu, Beijing (CN); Jinqi Li, Beijing (CN); Mingren Hu, Beijing (CN); Guobin Wang, Beijing (CN); Yang Luo, Beijing (CN); Yue Huang, Beijing (CN); Zhengyu Qian, Beijing (CN); En Shi, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 800 days.

(21) Appl. No.: 17/980,204

(22) Filed: Nov. 3, 2022

(65) Prior Publication Data

US 2023/0376726 A1     Nov. 23, 2023

(30) Foreign Application Priority Data

May 17, 2022     (CN) .......................... 202210540196.8

(51) Int. Cl.
*G06F 9/50*          (2006.01)
*G06F 11/34*        (2006.01)
(Continued)

(52) U.S. Cl.
CPC .......... *G06F 9/505* (2013.01); *G06F 11/3409* (2013.01); *G06N 3/04* (2013.01); *G06N 20/00* (2019.01)

(58) Field of Classification Search
CPC .......... G06N 3/04; G06N 20/00; G06F 9/505; G06F 11/3409
See application file for complete search history.

(56) References Cited

U.S. PATENT DOCUMENTS 11,288,601 B2 *   3/2022   Gupta ...................... G06N 5/04
11,301,762 B1     4/2022   Chen et al.
(Continued)

FOREIGN PATENT DOCUMENTS

CN         110262939 A      9/2019
CN         111414233 A      7/2020
(Continued)

OTHER PUBLICATIONS

Notification to Grant Patent Right for Invention of corresponding Chinese Patent Application No. 202210540196.8 issued on Jan. 19, 2024 in 7 pages.

(Continued)

*Primary Examiner* — Jacob D Dascomb
(74) *Attorney, Agent, or Firm* — Knobbe, Martens, Olson & Bear, LLP

(57) ABSTRACT

Provided are an inference service deployment method, a device and a storage medium, relating to the field of artificial intelligence technology, and in particular to the field of machine learning and inference service technology. The inference service deployment method includes: obtaining performance information of a runtime environment of a deployment end; selecting a target version of an inference service from a plurality of candidate versions of the inference service of a model according to the performance information of the runtime environment of the deployment end; and deploying the target version of the inference service to the deployment end.

17 Claims, 6 Drawing Sheets

(51) Int. Cl.
   *G06N 3/04*         (2023.01)
   *G06N 20/00*        (2019.01)

(56)                    References Cited

U.S. PATENT DOCUMENTS

| | | | |
|---|---|---|---|
| 11,315,039 | B1 | 4/2022 | Elprin |
| 11,392,469 | B2 * | 7/2022 | Mohamed ............... G06N 20/00 |
| 11,423,289 | B2 * | 8/2022 | Judd ........................ G06N 3/063 |
| 11,449,777 | B1 * | 9/2022 | Sathe .................. G06F 9/45558 |
| 11,816,461 | B2 * | 11/2023 | Agarwal ................... G06F 9/54 |
| 12,067,420 | B2 * | 8/2024 | Cho ...................... G05D 1/0212 |
| 2015/0379424 | A1 * | 12/2015 | Dirac ...................... G06N 20/00 |
| | | | 706/12 |
| 2022/0024032 | A1 | 1/2022 | Singh |
| 2022/0058511 | A1 | 2/2022 | McCusker et al. |
| 2022/0091837 | A1 | 3/2022 | Chai et al. |
| 2025/0021837 | A1 * | 1/2025 | He ............................ G06N 5/01 |

FOREIGN PATENT DOCUMENTS

| | | |
|---|---|---|
| CN | 111625245 A | 9/2020 |
| CN | 111708564 A | 9/2020 |
| CN | 112015470 A | 12/2020 |
| CN | 112379869 A | 2/2021 |
| CN | 112596745 A | 4/2021 |
| CN | 113419750 A | 9/2021 |
| CN | 114116481 A | 3/2022 |

OTHER PUBLICATIONS

Rybalko, "AI Model Lifecycle Management: Deploy Phase", IBM, 2020 in 14 pages.

Xue et al., "Regulatory Information Transformation Ruleset Expansion to Support Automated Building Code Compliance Checking", Automation in Construction, vol. 138, Jun. 2022 in 32 pages.

Zhu Mingwei, "AI engineering technology solutions in network intelligence", 2022, pp. 157-165.

Zhili et al., "Cloud Native Service Grid Based Al Model Deployment Scheme", Monthly Topic, 2021, pp. 32-36.

European Search Report received in Application No. 22204121 dated Aug. 14, 2023 in 10 pages.

First Office Action received in Chinese Application No. 202210540196.8 dated May 12, 2023.

Second Office Action received in Chinese Application No. 202210540196.8 dated Aug. 1, 2023.

Rejection Decision received in Chinese Application No. 202210540196.8 dated Oct. 17, 2023.

* cited by examiner

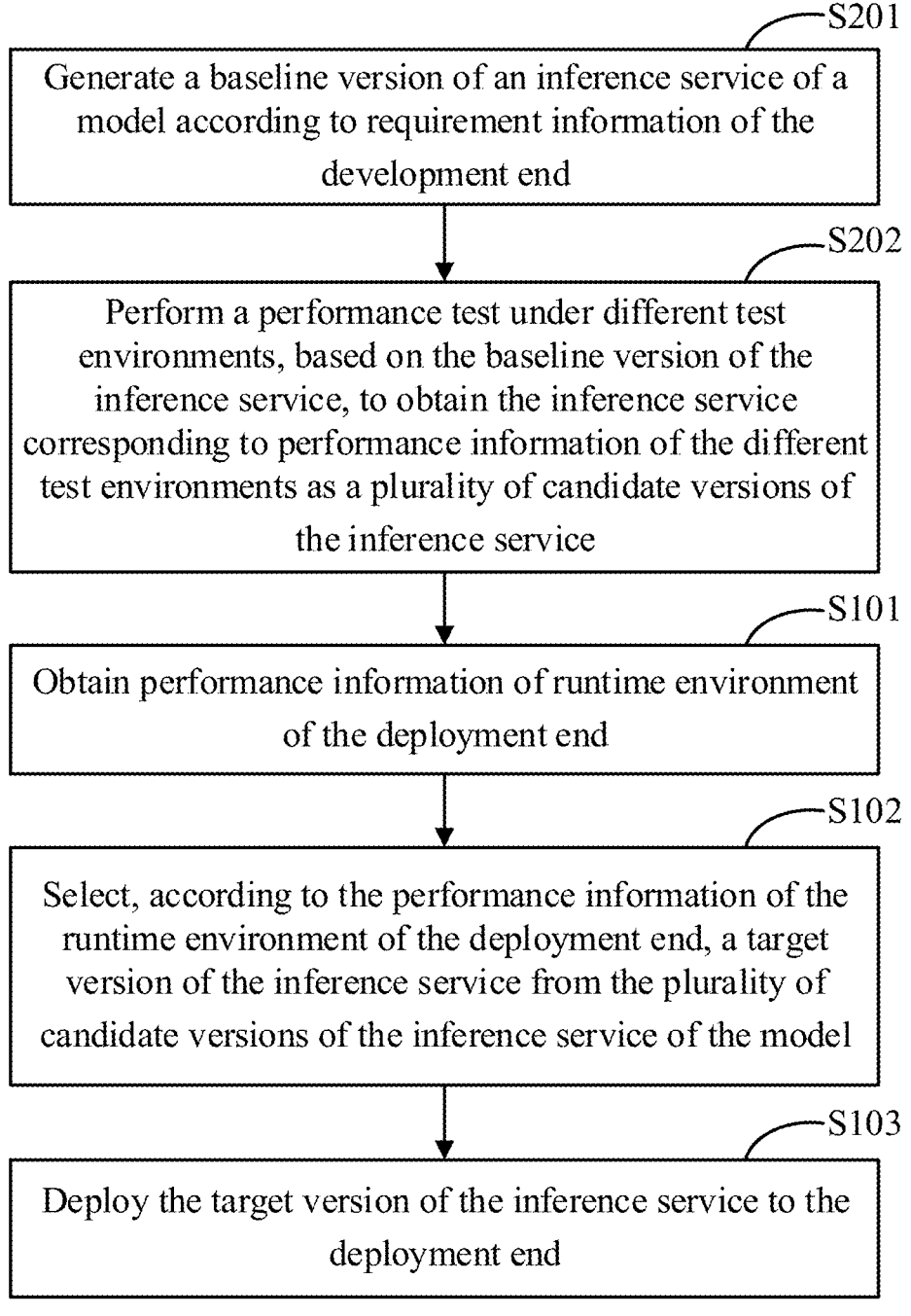

S201

Generate a baseline version of an inference service of a model according to requirement information of the development end

S202

Perform a performance test under different test environments, based on the baseline version of the inference service, to obtain the inference service corresponding to performance information of the different test environments as a plurality of candidate versions of the inference service

S101

Obtain performance information of runtime environment of the deployment end

S102

Select, according to the performance information of the runtime environment of the deployment end, a target version of the inference service from the plurality of candidate versions of the inference service of the model

S103

Deploy the target version of the inference service to the deployment end

FIG. 2

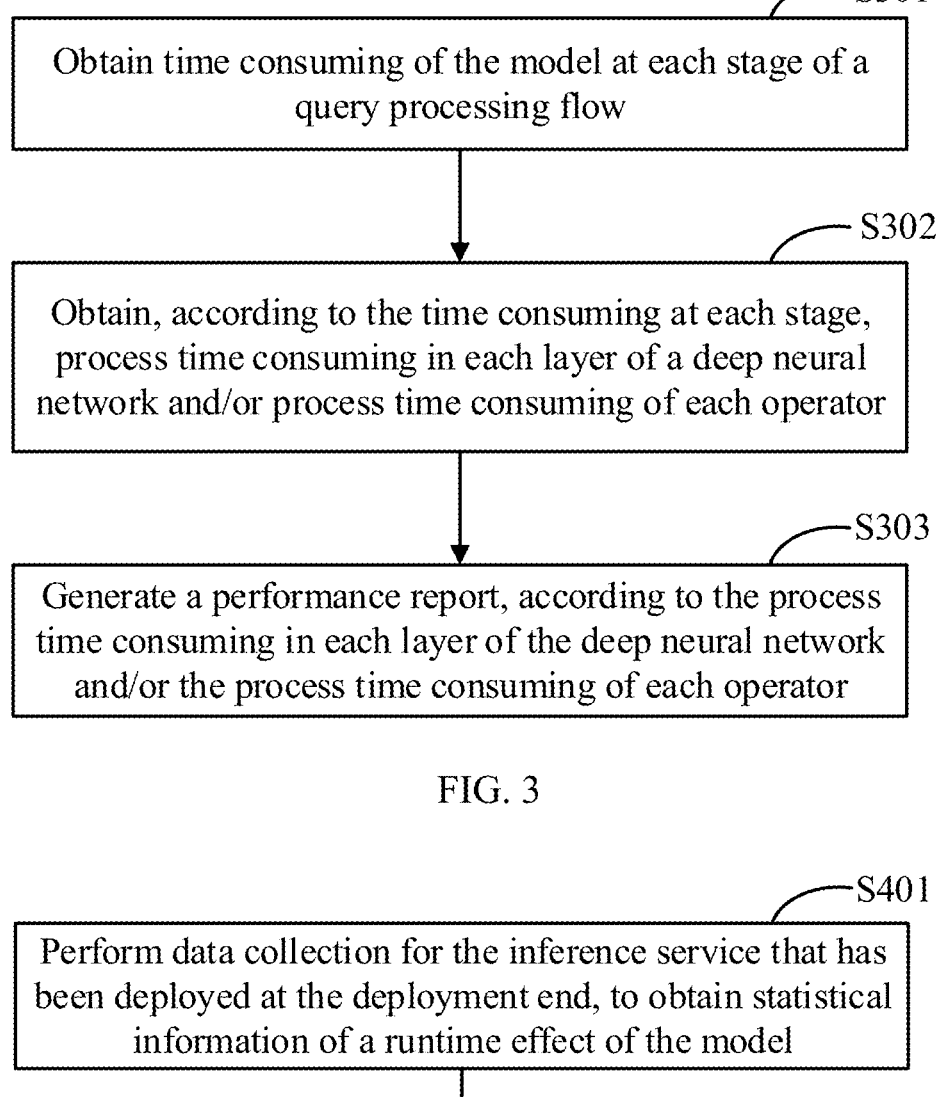

S301

Obtain time consuming of the model at each stage of a query processing flow

S302

Obtain, according to the time consuming at each stage, process time consuming in each layer of a deep neural network and/or process time consuming of each operator

S303

Generate a performance report, according to the process time consuming in each layer of the deep neural network and/or the process time consuming of each operator

Perform data collection for the inference service that has been deployed at the deployment end, to obtain statistical information of a runtime effect of the model

S402

Judge whether the model is suitable for a model runtime environment, according to the statistical information

FIG. 4

INFERENCE SERVICE DEPLOYMENT METHOD, DEVICE, AND STORAGE MEDIUM

CROSS-REFERENCE TO RELATED APPLICATIONS

The present application claims priority to Chinese Patent Application No. CN202210540196.8, filed with the China National Intellectual Property Administration on May 17, 2022, the disclosure of which is hereby incorporated herein by reference in its entirety.

TECHNICAL FIELD

The present disclosure relates to a field of artificial intelligence technology, and in particular, to a field of machine learning and inference service technology.

BACKGROUND

As an important link in the applications of artificial intelligence (AI), an AI inference service has gradually become an important component facility in the field of AI. The AI inference service is built based on a specific service framework and a model generated by model training. It can support model inference over heterogeneous computing power and efficiently process rich media inputs such as a table, an image, text, voice and video from the outside. At present, the AI inference service uses a lot of manpower in various links such as research and development and delivery. For example, research and development personnel, test personnel, operation and maintenance personnel, use personnel and the like are required to intervene in different links, resulting in that the human cost is high and the overall efficiency is low.

SUMMARY

The present disclosure provides an inference service deployment method and apparatus, a device and a storage medium.

According to one aspect of the present disclosure, there is provided an inference service deployment method, including: obtaining performance information of a runtime environment of a deployment end; selecting, according to the performance information of the runtime environment of the deployment end, a target version of an inference service from a plurality of candidate versions of the inference service of a model; and deploying the target version of the inference service to the deployment end.

According to another aspect of the present disclosure, there is provided an inference service deployment apparatus, including: an obtaining module configured to obtain performance information of a runtime environment of a deployment end; a selection module configured to select, according to the performance information of the runtime environment of the deployment end, a target version of an inference service from a plurality of candidate versions of the inference service of a model; and a deployment module configured to deploy the target version of the inference service to the deployment end.

According to another aspect of the present disclosure, there is provided an electronic device, including: at least one processor; and a memory connected in communication with at least one processor, where the memory stores an instruction executable by the at least one processor, and the instruction, when executed by at least one processor, enables at least one processor to execute the method of any one of embodiments of the present disclosure.

According to another aspect of the present disclosure, there is provided a non-transitory computer-readable storage medium storing a computer instruction thereon, and the computer instruction is configured to cause a computer to execute the method of any one of the embodiments of the present disclosure.

According to another aspect of the present disclosure, there is provided a computer program product including a computer program, and the computer program implements the method of any one of the embodiments of the present disclosure when executed by a processor.

In the embodiments of the present disclosure, the target version of the inference service may be selected from the candidate versions of the inference service of the model based on the performance information of the runtime environment of the deployment end, and the inference service of the model can be automatically and rapidly deployed to improve deployment efficiency of the inference service.

It should be understood that the content described in this part is not intended to identify critical or essential features of the embodiments of the present disclosure, nor is it used to limit the scope of the present disclosure. Other features of the present disclosure will be easily understood through the following description.

BRIEF DESCRIPTION OF THE DRAWINGS

The accompanying drawings are provided to better understand the present solution, and do not constitute a limitation to the present disclosure.

FIG. 2 is a flow diagram of an inference service deployment method according to another embodiment of the present disclosure.

FIG. 3 is a flow diagram of an inference service deployment method according to another embodiment of the present disclosure.

FIG. 4 is a flow diagram of an inference service deployment method according to another embodiment of the present disclosure.

DETAILED DESCRIPTION

Hereinafter, description of exemplary embodiments of the present disclosure will be made with reference to the accompanying drawings, which includes various details of the embodiments of the present disclosure to facilitate understanding and should be considered as merely exemplary. Therefore, those having ordinary skill in the art should realize, various changes and modifications may be made to the embodiments described herein without departing from the scope and spirit of the present disclosure. Likewise, for clarity and conciseness, description of well-known functions and structures will be omitted in the following descriptions.

Figure 1:
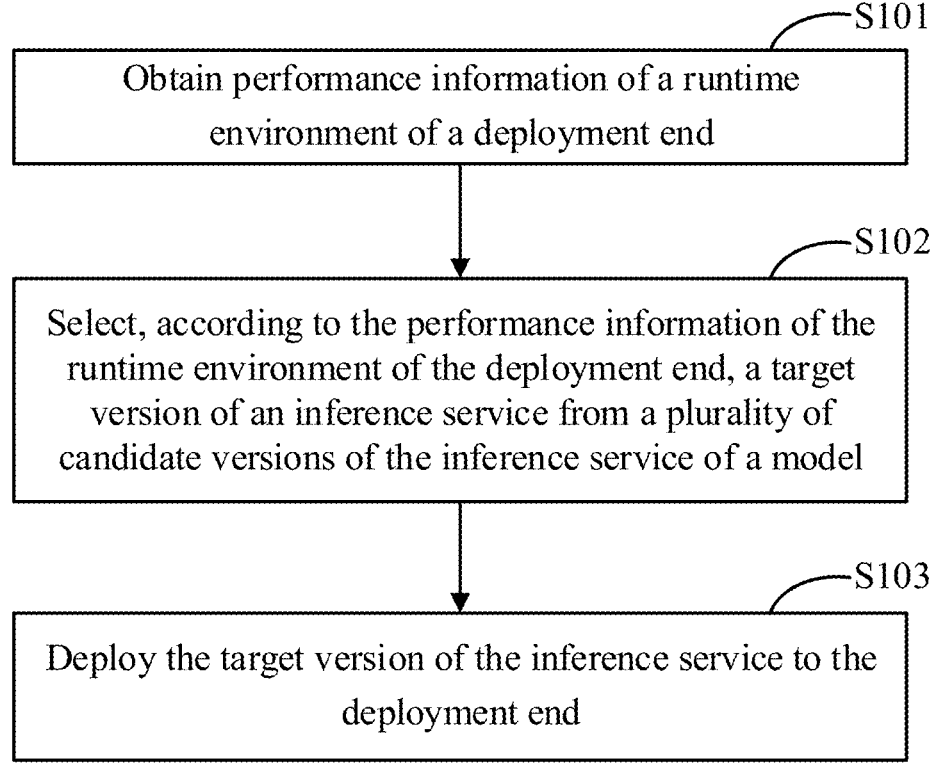
FIG. 1 is a flow diagram of an inference service deployment method according to an embodiment of the present disclosure.

FIG. 1 is a flow diagram of an inference service deployment method according to an embodiment of the present disclosure. The method may include the followings.

In S101, performance information of a runtime environment of a deployment end is obtained.

In S102, a target version of an inference service is selected from a plurality of candidate versions of the inference service of a model according to the performance information of the runtime environment of the deployment end.

In S103, the target version of the inference service is deployed to the deployment end.

The model in the embodiments of the present disclosure may include an AI model, e.g., a model produced based on training, such as machine learning, deep learning and other AI models. The model may perform a specific task and realize a specific function, such as voice recognition, image recognition, item classification and other models. For the specific task, after the model is obtained by training the task in the specified training environment, the model may be encapsulated and deployed as an inference service to provide a user with a specific function. In an inference management server, a plurality of candidate versions of the inference service of a model may be generated in advance. Each candidate version of the inference service may correspond to a resource and a configuration parameter applicable to the model. The resources and configuration parameters corresponding to different candidate versions of the inference service may be different. In the embodiments of the present disclosure, the inference management server may include various types of devices such as a single machine, a cluster, a cloud and the like. An inference management server end and the deployment end may be the same device or different device. For example, if the inference management server end and the deployment end obtain performance information of a runtime environment of the deployment end.

For example, if the inference management server and the deployment end are separate, an inference service management system, such as an AI inference service full-life cycle management system, may be installed on the inference management server. An inference service deployment module of the system may perform S101 to S103. In S103, an inference management server may send the target version of the inference service to the deployment end for deployment.

As another example, if the inference management server and the deployment end are merged, the inference service management system may be installed at the deployment end. The inference service deployment module of the system may perform S101 to S103. In S103, a deployment end deploys the target version of the inference service on itself.

In the embodiments of the present disclosure, the target version of the inference service may be selected from the candidate versions of the inference service of the model, and the inference service of the model can be automatically and rapidly deployed to improve the deployment efficiency of the inference service.

FIG. 2 is a flow diagram of an inference service deployment method according to another embodiment of the present disclosure. The method of this embodiment includes one or more features of the inference service deployment method of the above-described embodiment. In a possible implementation, the method further includes the followings.

In S201, a baseline version of the inference service of the model is generated according to requirement information of the development end.

In S202, a performance test is performed under different test environments, based on the baseline version of the inference service, to obtain the inference service corresponding to performance information of the different test environments as the plurality of candidate versions of the inference service.

In a possible implementation, the requirement information includes at least one of: a software environment in which the inference service is capable of being operated; a hardware environment in which the inference service is capable of being operated; a starting mode of the inference service; an access mode of the inference service; a query processing flow of the inference service; or an additional function integration of the inference service.

In the embodiments of the present disclosure, the inference service management server or the inference service management system on the deployment end may have an inference service building module. The inference service building module may receive requirement information from the development end. The requirement information may be selected from pre-configured information or set according to a personalized need of a developer.

Exemplarily, in the requirement information, the software and hardware environment that the inference service is capable of being operated may include computing power hardware required by the model and a corresponding driver thereof, software such as the runtime library, a type of central processing unit (CPU) instruction set, an operating system, and dependent software related to the type of the model.

Exemplarily, in the requirement information, the starting mode of the inference service may include a service starting command, a model loading mode and the like. The service starting command may include a specific command code for starting the inference service and the like. The model loading mode may include a loading mode corresponding to various types of models. The service starting command and model loading mode may be preset or customized by a developer.

Exemplarily, in the requirement information, the access mode of the inference service may include a communication protocol of the inference service, a service port, an internal service address and the like. The access mode of the inference service may be preset or customized by the developer.

Exemplarily, in the requirement information, the query processing flow of the inference service may include pre-processing, inference, post-processing and other stages. The query processing flow of the inference service may be a default process or customized by a developer.

Exemplarily, in the requirement information, the additional function integration of the inference service may include an integration of software modules required for functions such as serverless, security reinforcement, an observability component and the like.

In the embodiments of the present disclosure, on the development end, the developer may select or input one or more types of the above-described requirement information, and then send the specific requirement information from the development end to the inference management server or the deployment end. The inference management server or the inference service building module of the deployment end may build a baseline version of the inference service for the model based on the specific requirement information of the development end, and the baseline version of the inference service may integrate an image of the dependent software runtime library. In this way, building the baseline version of the inference service for the model based on the requirement information of the development end is conducive to accelerating the acquisition of the inference service applicable to the model based on the baseline version of the inference service.

In a possible implementation, performance information of different runtime environments includes at least one of: Queries Per Second (QPS) that is able to be borne under different resource amounts and different parameter configurations; or query time consuming at different quantile levels.

In a possible implementation, a resource amount includes a quantity of CPU cores, and a parameter configuration includes at least one of a quantity of processes, a quantity of threads, a synchronous mode, or an asynchronous mode. The resource amount, the parameter configuration, the quantile and the like belong to the runtime environment, QPS, while the query time consuming and the like belong to the performance information.

For example, the quantity of CPU cores is c1, the quantity of processes is m1, the quantity of threads is n1, the mode is the synchronous mode, and the bearable QPS is q1; the quantity of CPU cores is c2, the quantity of processes is m2, the quantity of threads is n2, the mode is the synchronous mode, and the bearable QPS is q2; the quantity of CPU cores is c2, the quantity of processes is m2, the quantity of threads is n2, the mode is the asynchronous mode, and the bearable QPS is q3, where q1, q2 and q3 are different.

For another example, the query time consuming is T1 at the level of a quantile P1; the query time consuming is T2 at the level of a quantile P2, where T1 and T2 are different.

In the embodiments of the present disclosure, the baseline version of the inference service of the model may be operated in different runtime environments, for example, the baseline version of the inference service of the image recognition model may be operated to recognize some images. In addition, the performance information of the inference service of the model working in different runtime environments may be recorded. If the performance information cannot satisfy the requirement, the resource amount, the parameter configuration, the quantiles and the like included in the runtime environment may be adjusted to obtain optimized performance information. In the case where the runtime environment is adjusted, the candidate version of the inference service may be obtained. For example, the runtime environment corresponding to the baseline version of the inference service includes a resource amount A1, a parameter configuration A2, and a quantile A3; the runtime environment corresponding to a first candidate version of the inference service includes a resource amount B1, a parameter configuration B2, and a quantile B3; the runtime environment corresponding to a second candidate version of the inference service includes a resource amount C1, a parameter configuration C2 and a quantile C3.

In a possible implementation, in S202, performing runtime environment performance test based on the baseline version of the inference service includes: performing, through a heuristic search algorithm, the runtime environment performance test, based on the baseline version of the inference service.

In the embodiments of the present disclosure, the heuristic search algorithm may evaluate each searched position by means of a search in a state space to obtain the best position, and then conduct a search from the position until the target is reached. There are many heuristic search algorithms, such as ant colony algorithm, genetic algorithm, simulated annealing algorithm and the like. The search algorithm can speed up a processing speed of the runtime environment performance test of the inference service, and further, can improve a tuning speed of the inference service version. The runtime environment in the performance test may also be called a test environment.

In a possible implementation, as shown in FIG. 3, the runtime environment performance test based on the baseline version of the inference service includes at least one of the followings.

In S301, time consuming of the model at each stage of a query processing flow is obtained. For example, the time consuming of the model at each stage of the query processing flow is captured by a code instrumentation mode.

In S302, process time consuming in each layer of a deep neural network and/or process time consuming of each operator is obtained according to the time consuming at each stage.

In S303, a performance report is generated according to the process time consuming in each layer of the deep neural network and/or the process time consuming of each operator.

In the embodiments of the present disclosure, code instrumentation may also be called program instrumentation. A probe may be inserted into the tested code, and then the information such as control flow and data flow of the code may be obtained by the execution of the probe, so as to achieve the purpose of testing the code. Based on the baseline version of the inference service of the model, a code instrumentation mode may test the runtime performance of the model and capture the time consuming of the model at each stage of the query processing flow. In this way, the time consuming of the model at each stage of the query processing flow can be added to the performance report.

In the embodiments of the present disclosure, the process time consuming in each layer of the deep neural network and/or the process time consuming of each operator are obtained according to the time consumption of the model at each stage of the query processing flow. In this way, the process time consuming in each layer and/or the process time consuming of each operator can be added to the performance report. In addition, the performance report may be fed back to the development end and the test end, so as to promote the development end and the test end to improve the model.

In a possible implementation, in S103, deploying the target version of the inference service to the deployment end includes: determining a resource amount corresponding to the target version of the inference service and a configuration parameter corresponding to the inference service; determining a quantity of copies and an external access address of the target version of the inference service; and launching the target version of the inference service online to the deployment end based on the resource amount corresponding to the target version of the inference service, the configuration parameter corresponding to the inference service, the quantity of copies and the external access address.

In the embodiments of the present disclosure, after the target version of the inference service is selected from the candidate versions of the inference service based on the resource amount and the configuration parameter included in the current runtime environment of the deployment end, the target version of the inference service applicable to the current runtime environment of the deployment end may be launched on the deployment end, so as to provide a client with better services of the model such as image recognition, intelligent search, text conversion and the like.

In a possible implementation, the method further includes at least one of the followings.

Case 1: updating the inference service that has been deployed at the deployment end in a rolling manner.

Case 2: removing the inference service that has been deployed at the deployment end from the deployment end.

Case 3: adjusting a traffic proportion of queries for each version of the inference service, in the case where the deployment end includes coexisting of multiple versions of the inference service.

In the embodiments of the present disclosure, the inference service that has been deployed may need to be updated or removed, and there may be coexisting of multiple versions of the inference service. Timely updates can keep the version of inference service currently deployed at the deployment end relatively new, timely removal can reduce the redundant inference service, and the coexisting of multiple versions of the inference service is conducive to stable transition the updates of the inference service.

In a possible implementation, in case 1, updating the inference service that has been deployed at the deployment end includes: updating a new version of the inference service that has been deployed at the deployment end by a specified quantity of copies in a rolling manner, to gradually replace an old version of the inference service that has been deployed at the deployment end.

In a possible implementation, in case 1, updating the inference service that has been deployed at the deployment end includes: allowing a new version of the inference service that has been deployed at the deployment end to gradually replace an old version of the inference service that has been deployed at the deployment end according to a traffic percentage.

In the embodiments of the present disclosure, the rolling update may also be called a rolling release, which may update only a part of the copies at one time and which may, after the update is succeeded, update more copies until all copies are updated completely. The rolling update is conducive to ensuring service continuity. Gray update may also be called a gray release, which may support a portion of users to continue to use the old version of the inference service and a portion of users to start using the new version of the inference service. If the users object to the new version of the inference service modestly, all the users may be migrated to the new version of the inference service as the scope of the use is gradually expanded. The gray update is helpful to ensure the stability of the inference service.

In a possible implementation, as shown in FIG. 4, the method further includes the followings.

In S401, data collection is performed for the inference service that has been deployed at the deployment end, to obtain statistical information of a runtime effect of the model.

In S402, whether the model is suitable for a model runtime environment is judged according to the statistical information.

In the embodiments of the present disclosure, the model runtime environment may also be referred to as a production environment or an online environment. The model runtime environment may be a runtime environment in which the model has been put into real production after deployment, and the model is capable of being operated continuously in the model runtime environment. Input data in the model runtime environment is unpredictable and evolves over time. It is necessary to monitor whether the model is offset in the model runtime environment and suitable for the model runtime environment.

In a possible implementation, the statistical information includes at least one of: a query data distribution offset of the model in different periods of the model runtime environment; a data distribution offset of the model between query data in the model runtime environment and model training data; or a comparison result of the model between an output result in the model runtime environment and a labeling result.

The inference service that has been deployed of the model (e.g., the target version of the inference service) is operated at the deployment end. For example, during runtime an inference service of an image recognition model, real-time data such as actual query data and a recognition result of the inference service of the image recognition model may be collected. Statistics are made according to one or more dimensions such as time, input data and an output result to obtain the statistical information of the operation effect of the model. In this way, it is beneficial to know whether the actual effect of the model in the production environment is offset, so that the model can be optimized in time. For example, if it is obtained that a model is no longer suitable for the model runtime environment according to any one or more type of the above statistical information, a new continuous training process of the model may be triggered to train a new model using the latest data.

Figure 5:
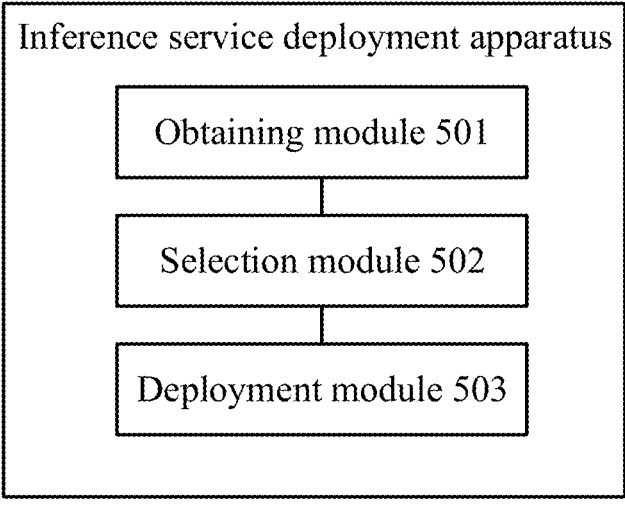
FIG. 5 is a block diagram of an inference service deployment apparatus according to an embodiment of the present disclosure.

FIG. 5 is a block diagram of an inference service deployment apparatus according to an embodiment of the present disclosure. The apparatus may include: an obtaining module 501 configured to obtain performance information of a runtime environment of a deployment end; a selection module 502 configured to select a target version of an inference service from a plurality of candidate versions of the inference service of a model, according to the performance information of the runtime environment of the deployment end; and a deployment module 503 configured to deploy the target version of the inference service to the deployment end.

Figure 6:
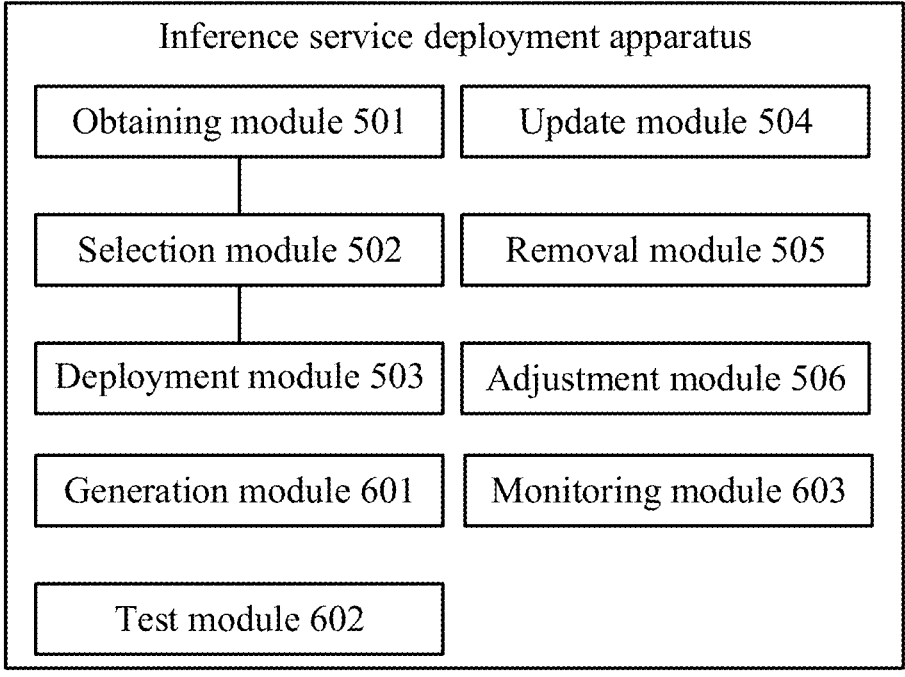
FIG. 6 is a block diagram of an inference service deployment apparatus according to another embodiment of the present disclosure.

FIG. 6 is a block diagram of an inference service deployment apparatus according to another embodiment of the present disclosure. The apparatus of the embodiment includes one or more features of the inference service deployment apparatus according to the above embodiment. In a possible implementation, the apparatus further includes: a generation module 601 configured to generate a baseline version of the inference service of the model, according to requirement information of the development end; and a test module 602 configured to perform a performance test under different test environments, based on the baseline version of the inference service, to obtain the inference service corresponding to performance information of the different test environments as the plurality of candidate versions of the inference service.

In a possible implementation, the requirement information includes at least one of: a software environment in which the inference service is capable of being operated; a hardware environment in which the inference service is capable of being operated; a starting mode of the inference service; an access mode of the inference service; a query processing flow of the inference service; or an additional function integration of the inference service.

In a possible implementation, performance information of different runtime environments includes at least one of: Queries Per Second (QPS) that is able to be borne under different resource amounts and different parameter configurations; or query time consuming at different quantile levels, where a resource amount includes a quantity of CPU cores, and a parameter configuration includes at least one of a quantity of processes, a quantity of threads, a synchronous mode, or an asynchronous mode.

In a possible implementation, the test module 602 is configured to perform, through a heuristic search algorithm, the runtime environment performance test, based on the baseline version of the inference service.

In a possible implementation, the test module 602 is configured to perform at least one of: obtaining time consuming of the model at each stage of a query processing flow; for example, capturing the time consuming of the model at each stage of the query processing flow by a code instrumentation mode; obtaining, according to the time consuming at each stage, process time consuming in each layer of a deep neural network and/or process time consuming of each operator; or generating, according to the process time consuming in each layer of the deep neural network and/or the process time consuming of each operator, a performance report.

In a possible implementation, the deployment module 503 is configured to determine a resource amount corresponding to the target version of the inference service and a configuration parameter corresponding to the inference service; determine a quantity of copies and an external access address of the target version of the inference service; and launch the target version of the inference service online to the deployment end, based on the resource amount corresponding to the target version of the inference service, the configuration parameter corresponding to the inference service, the quantity of copies, and the external access address.

In a possible implementation, the apparatus further includes at least one of: an update module 504 configured to update the inference service that has been deployed at the deployment end; a removal module 505 configured to remove the inference service that has been deployed at the deployment end from the deployment end; and an adjustment module 506 configured to adjust a traffic proportion of queries for each version of the inference service, in the case where the deployment end includes coexisting of multiple versions of the inference service.

In a possible implementation, the update module 504 is configured to update a new version of the inference service that has been deployed at the deployment end by a specified quantity of copies in a rolling manner, to gradually replace an old version of the inference service that has been deployed at the deployment end; or allow a new version of the inference service that has been deployed at the deployment end to gradually replace an old version of the inference service that has been deployed at the deployment end according to a traffic percentage.

In a possible implementation, the apparatus further includes: a monitoring module 603 configured to perform real-time data collection for the inference service that has been deployed at the deployment end, to obtain statistical information of a runtime effect of the model; and judge, according to the statistical information, whether the model is suitable for a model runtime environment.

In a possible implementation, the statistical information includes at least one of: a query data distribution offset of the model in different periods of the model runtime environment; a data distribution offset of the model between query data in the model runtime environment and model training data; or a comparison result of the model between an output result in the model runtime environment and a labeling result.

For the description of the specific function and example of each module and sub-module of the apparatus according to the embodiments of the present disclosure, reference may be made to the relevant description of the corresponding step in the above method embodiments, the description of which will not be repeated herein.

With the accelerated and large-scale implementation of AI in various industries, the research and development and the delivery of the AI inference service are facing a new challenge. Firstly, a plurality of heterogeneous models need inference service frameworks matched therewith, which makes it difficult to unify the inference service frameworks and sharply increases costs of the research and development. Secondly, the same model may have different performances under heterogeneous computing power and different parameter configurations of the same service framework, and the cost of performance optimization is high. Moreover, the production environment is a model with a better application effect and the inference service is often subjected to frequent deployments and upgrade operations, which is easy to lead to higher cost and risk of the operation and maintenance. Finally, the inference service that has been deployed in the production environment may no longer satisfy the premise of the established data distribution due to the change in an application scenario, causing an undesirable model effect.

In addition, the research and development and the delivery of the AI inference service in related technologies adopt a plurality of schemes requiring manual intervention in various links, as shown in the following examples.

In the service construction link, for different types of models, research and development personnel choose the matching deep learning/machine learning framework; develop the inference service based on the inference interface provided by the framework; and referring to a requirement of business application, exposes the inference service outside as an interface structure that satisfies the requirement. Therefore, the cost of the research and development in the service construction link is high, and model adaptation and service interface development occupy a lot of research and development manpower.

In the performance optimization link, a tester first considers the environment and the hardware condition during actual deployment, mainly including CPU, GPU and other computing power types; based on a pre-release of inference service completed in the selected environment, the tester adjusts relevant inference service parameters to performs a performance test using a preset traffic strategy or production reproduced environment traffic; iterating is repeated to obtain the optimal inference service configuration. Therefore, the test cost of the performance optimization is high, and a lot of hardware environments and parameter configurations must be taken over manually.

In the service deployment link, the operation and maintenance personnel obtain the deployment package of the stable version of the inference service; for the new deployment and update deployment of the production environment, deployment schemes are designed, respectively, including an online process and a failure rollback plan; in order to ensure the availability of service, a deployment process generally adopts a gray release, involving small traffic verification and other links. Therefore, the cost of the operation and maintenance in the service deployment link is high and process documents are often relied on to standardize the online and change processes.

In the model monitoring link, at present, only the monitoring of the availability and the performance of the inference service is often involved in, and the offset monitoring of the model effect must rely on manual feedback from an external business. Therefore, the model monitoring link needs a lot of manual feedback and the inference service itself cannot quickly perceive the changes in the application scenario, which is likely to lead to an undesirable model effect over time.

Therefore, the interaction between various links of the AI inference service in related technologies requires complicated man-made agreement, resulting in high communication cost, high error risk, and low overall efficiency.

The inference service deployment method proposed in the embodiments of the present disclosure for the characteristics of the AI inference service is an automated management method covering the whole life cycle of AI inference service. The method may seamlessly connect multiple links including service construction, performance optimization, deployment management and model monitoring, and combine with the model training system to form a closed loop of continuous integration of inference service automation, reducing the cost of the research and development and the delivery of the AI inference service. Based on this method, the business system can quickly and automatically realize the construction, optimization, deployment and monitoring of the inference service based on the models produced by training, significantly improving the efficiency of the research and development and the delivery and reducing human costs.

Figure 7:
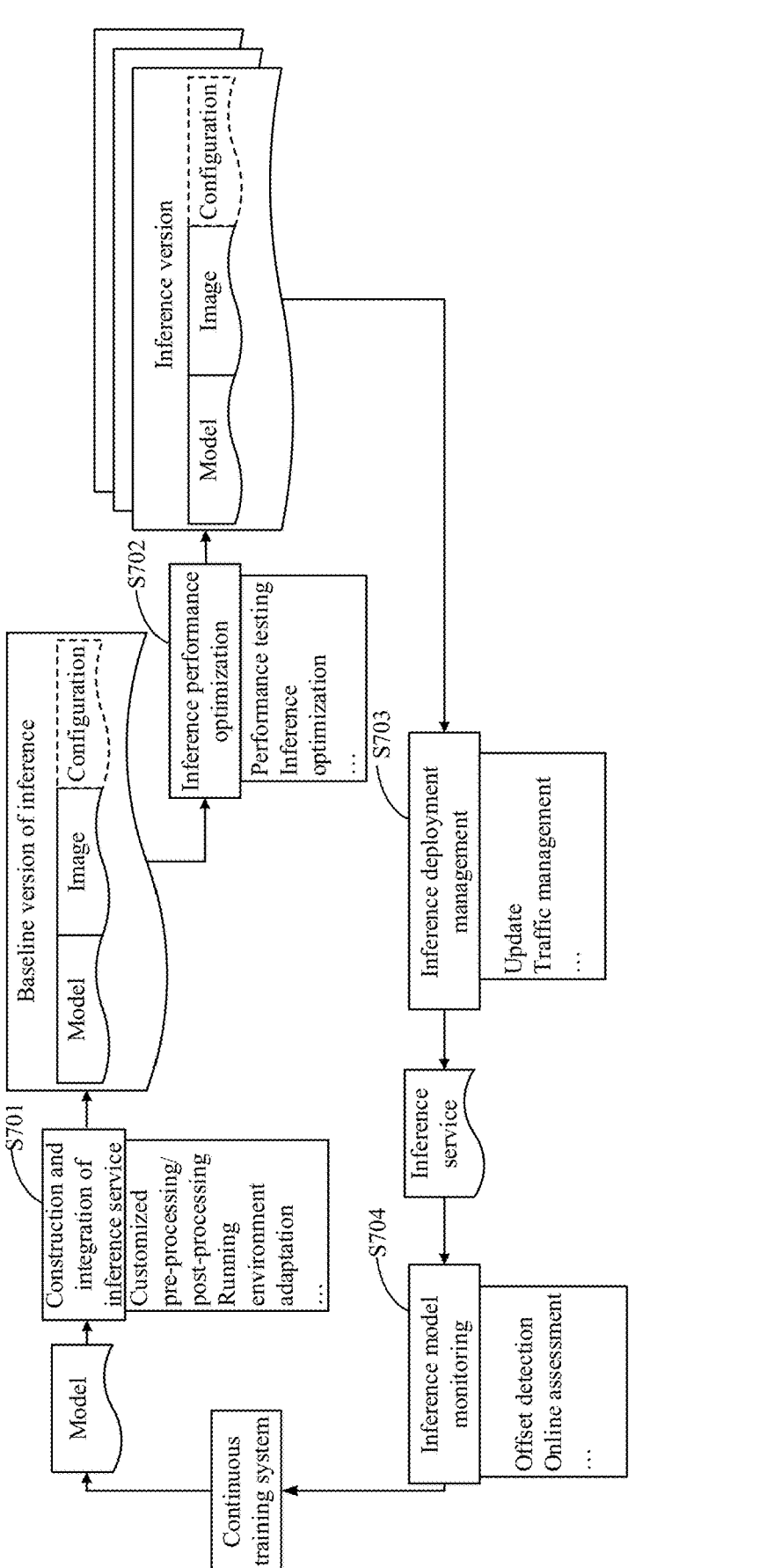
FIG. 7 is a schematic diagram of an application scenario of an inference service deployment method according to an embodiment of the present disclosure.

Hereinafter, exemplary links involved in the whole life cycle of a multi-tenant AI inference service will be described in detail. As shown in FIG. 7, the whole life cycle of AI inference service mainly includes inference service construction and integration, inference service performance optimization, inference deployment management, inference model monitoring and the like. Various links are interconnected in the following ways.

Inference Service Construction and Integration (S701)

As a starting point of the AI inference service life cycle, the inference service construction and the integration link build a baseline version of the inference service for the input model according to the customized needs of the developer. The baseline version of the inference service may integrate an image of the dependent software runtime. The link may be oriented to the development end to obtain customized demand information of the developer from the development end. Examples of the developer's customized demand information are as follows.

a. The software environment and hardware environment in which the inference service is capable of being operated include, for example, required computing hardware and the corresponding driver/runtime software, a type of CPU instruction set, an operating system, and dependent software related to the model type. According to these environmental requirements, the link may provide a matching basic software environment for a specific inference service, such as the baseline version of the inference service, to ensure that the inference service can be operated smoothly in the desired software and hardware environment. b. The starting mode of inference service includes, for example, a service start command, a model loading mode and the like. The link may preset corresponding service startup commands and model loading methods for mainstream machine learning, deep learning and other frameworks, or support the developers to customize service startup commands, a model loading method and other behaviors.

c. The access mode of the inference service includes, for example, a communication protocol of the service, a service port, an internal service address and the like. In addition, developers may also be allowed to customize or adopt a preset access mode of mainstream machine learning, deep learning and other frameworks.

d. The query processing flow of inference service includes, for example, preprocessing, inference, post-processing and other stages. Each stage may allow the developers to customize the behavior of the processing flow or adopt the default processing flow.

e. Additional function integration of the inference service includes integration of software modules required for functions such as serverless, security reinforcement, observability components and the like.

Inference Service Performance Optimization (S702)

In the above inference service construction and integration link, the baseline version of the inference service may be generated for the model. The baseline version of the inference service may provide service in a specific software and hardware environment in a runtime manner desired by the developers. In the inference service performance optimization link, performance related tests and iterative optimization experiments may be conducted based on the baseline version of the inference service to depict a performance portrait of the inference service under different resource conditions and parameter configurations. Herein, the performance portrait may include a plurality of candidate versions of the inference service, and the inference service of different candidate versions correspond to performance information of the model in different runtime environments. Further, the most suitable inference service version may be recommended for the developers based on the performance portrait. Herein, this link may be oriented to the test end, and an operator of the test end may be a tester or a developer. In particular:

a. By the performance test, performance information corresponding to different runtime environment information of the inference service can be known, such as bearable Queries Per Second (QPS) of the service under different resource amounts (such as the quantity of CPU cores) and different parameter configurations (such as the quantity of processes, the quantity of threads, synchronous mode, asynchronous mode, etc.), and the query time consuming at different quantile levels.

b. Through a heuristic search algorithm, times of iterative optimization experiments can be reduced, so as to quickly find out the most suitable version of the inference service.

c. Inference optimization: by capturing the time-consuming at each stage of the query processing flow by automatic code instrumentation, the process time consuming of each layer and/or each operator of the deep neural network may be further known, so as to provide a detailed performance report.

Inference Deployment Management (S703)

In the inference service construction and integration link, the optimal version of the inference service (for example, the target version of the inference service) may be produced, and in the inference deployment management link, the relevant process of inference service deployment may be managed. The link may be oriented to the deployment end. The deployment end may also be called a service provider end. In an example, the development and testing link of the life cycle management of the AI inference service may also be performed in a server such as a cloud or a cluster and other servers, to obtain the target version of the inference service, and then the inference service may be deployed offline to the service provider end. In another example, a life cycle management system of the AI inference service may also be pre-installed on the service provider end, and the development, testing, deployment and other links may be performed on the service provider end. Specifically, an example of a deployment process includes at least one of the followings.

a. New deployment of inference service: based on the resource and configuration parameter of the inference service version and the specified quantity of copies and external access address of the inference service, the inference service is launched online to a target deployment platform (i.e., the deployment end).

b. Update deployment of inference service: for example, it includes rolling update and gray update. In the rolling update, a new version of the inference service is upgraded in a rolling manner according to the specified quantity of copies, gradually replacing an old version service; in the gray update, a new version of the inference service is allowed to gradually replace an old version of the inference service according to the traffic percentage.

c. Offline of the inference service: the inference service that has been deployed is removed from the target deployment platform and no longer provides an external service.

d. Traffic management of the inference service: for the coexisting of multiple versions of the inference service, it is allowed to adjust a traffic proportion of queries for each version of the inference service.

Inference Model Monitoring (S704)

In the inference model monitoring link, real-time data collection may be carried out on the inference service that has been deployed, to obtain statistical information on the model effect of the model runtime environment (i.e., the production environment), in order to judge whether the current model is still applicable to the current model runtime environment. For example, the statistics information to be checked is as follows.

a. Check a query data distribution offset in different periods of the model runtime environment.

b. Check a data distribution offset between query data of the model runtime environment and model training data.

c. Check a validity of the model by comparing a model output result of the model runtime environment with a real annotation result.

For example, in the machine learning model, the degree of offset mean (generally 2 standard deviations) may be used to judge the deviation of the data feature variable (i.e., the data distribution offset):

$$|x_k - \mu| \geq 2\sigma; \sigma = \sqrt{\frac{1}{N}\sum_{i=1}^{N}(x_i - \overline{x})^2}; \text{ and } \mu = \frac{1}{N}\sum_{i=1}^{N}x_i;$$

where $x_k$ is a new sample to be processed (i.e., a certain feature dimension); $\mu$ is an estimated overall mean value of the dimension; $\sigma$ is an estimated overall standard deviation of the dimension; N is the quantity of samples; $x_i$ is the i-th sample in the sample set; and $\overline{x}$ is a mean value of the samples. For example, in the calculation of the query data distribution offset in different periods of the model runtime environment, $x_k$ may be new query data to be processed in a certain period, $x_i$ may be the i-th query data in a certain period, $\overline{x}$ is a mean value of the query data, $\mu$ may be the estimated overall mean value of the query data; $\sigma$ may be the estimated overall standard deviation of the query data; and N may be the quantity of query data.

If the feedback model of the above check result is no longer applicable to the current model runtime environment, a new continuous training process may be triggered to train a new model using the latest data.

In the technical solution of the present disclosure, the acquisition, storage and application of the user's personal information involved are all in compliance with the provisions of relevant laws and regulations, and do not violate public order and good customs.

According to the embodiments of the present disclosure, the present disclosure also provides an electronic device, a readable storage medium and a computer program product.

Figure 8:
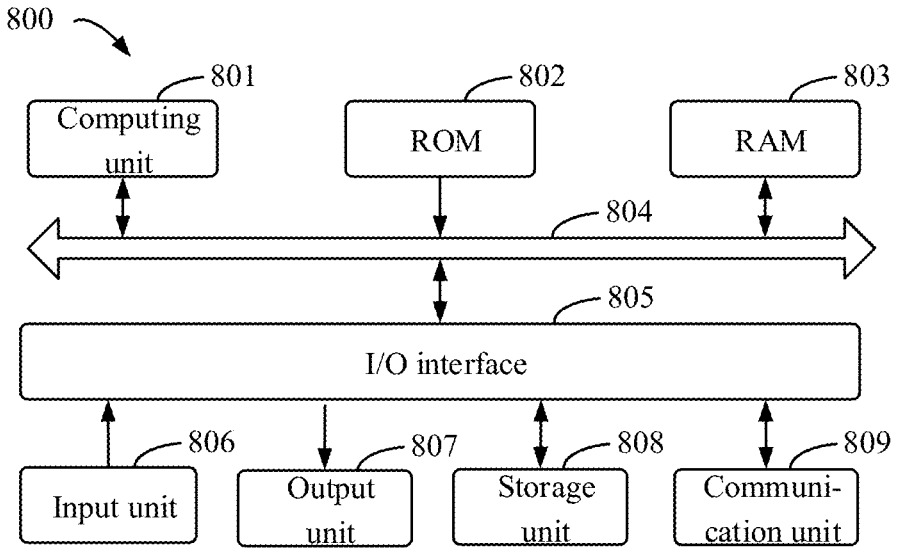
FIG. 8 is a block diagram of an electronic device for implementing an inference service deployment method according to an embodiment of the present disclosure.

FIG. 8 shows a schematic block diagram of an exemplary electronic device 800 that can be used to implement the embodiments of the present disclosure. The electronic device is intended to represent various forms of digital computers such as a laptop, a desktop, a workstation, a personal digital assistant, a server, a blade server, a mainframe computer, and other suitable computers. The electronic device may also represent various forms of mobile devices such as a personal digital processing, a cellular phone, a smart phone, a wearable device and other similar computing devices. The components shown herein, their connections and relationships, and their functions are merely exemplary, and are not intended to limit the implementation of the present disclosure as described and/or required herein.

As shown in FIG. 8, the device 800 includes a computing unit 801 configured to perform various appropriate operations and processes according to a computer program stored in a Read-Only Memory (ROM) 802 or a computer program loaded from a storage unit 808 into a Random Access Memory (RAM) 803. Various programs and data required for an operation of device 800 may also be stored in the RAM 803. The computing unit 801, the ROM 802 and the RAM 803 are connected to each other through a bus 804. The input/output (I/O) interface 805 is also connected to the bus 804.

A plurality of components in the device 800 are connected to the I/O interface 805, including an input unit 806 such as a keyboard, a mouse, or the like; an output unit 807 such as various types of displays, speakers, or the like; the storage unit 808 such as a magnetic disk, an optical disk, or the like; and a communication unit 809 such as a network card, a modem, a wireless communication transceiver, or the like. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 801 performs various methods and processing described above, such as the above inference service deployment method. For example, in some implementations, the above inference service deployment method may be implemented as a computer software program tangibly contained in a computer-readable medium, such as the storage unit 808. In some implementations, a part or all of the computer program may be loaded and/or installed on the device 800 via the ROM 802 and/or the communication unit 809. When the computer program is loaded into RAM 803 and executed by the computing unit 801, one or more steps of the inference service deployment method described above may be performed. Alternatively, in other implementations, the computing unit 801 may be configured to perform the above inference service deployment method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs runtime on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. An inference service deployment method, comprising:
   obtaining performance information of a runtime environment of a deployment end, wherein the performance information of the runtime environment comprises query time consuming at different quantile levels;
   selecting, according to the performance information of the runtime environment of the deployment end, a target version of an inference service from a plurality of candidate versions of the inference service of a model;
   deploying the target version of the inference service to the deployment end, by:
      determining a resource amount corresponding to the target version of the inference service and a configuration parameter corresponding to the inference service;
      determining a quantity of copies and an external access address of the target version of the inference service; and
      launching the target version of the inference service online to the deployment end, based on the resource amount corresponding to the target version of the inference service, the configuration parameter corresponding to the inference service, the quantity of copies and the external access address;

updating the inference service that has been deployed at the deployment end, by:

updating a new version of the inference service that has been deployed at the deployment end by a specified quantity of copies in a rolling manner, to gradually replace an old version of the inference service that has been deployed at the deployment end;

performing data collection for the inference service that has been deployed at the deployment end, to obtain statistical information of a runtime effect of the model, wherein the statistical information comprises at least one of: a query data distribution offset of the model in different periods of a model runtime environment, a data distribution offset of the model between query data in the model runtime environment and model training data, or a comparison result of the model between an output result in the model runtime environment and a labeling result; and judging, according to the statistical information, whether the model is suitable for the model runtime environment.

2. The method of claim 1, further comprising:

generating, according to requirement information of a development end, a baseline version of the inference service of the model; and performing a performance test under different test environments, based on the baseline version of the inference service, to obtain the inference service corresponding to performance information of the different test environments as the plurality of candidate versions of the inference service.

3. The method of claim 2, wherein the requirement information comprises at least one of:

a software environment in which the inference service is capable of being operated;

a hardware environment in which the inference service is capable of being operated;

a starting mode of the inference service;

an access mode of the inference service;

a query processing flow of the inference service; or an additional function integration of the inference service.

4. The method of claim 2, wherein performance information of different test environments comprises:

Queries Per Second, abbreviated as QPS, that is able to be borne under different resource amounts and different parameter configurations;

wherein a resource amount comprises a quantity of CPU cores, and a parameter configuration comprises at least one of a quantity of processes, a quantity of threads, a synchronous mode, or an asynchronous mode.

5. The method of claim 3, wherein performance information of different test environments comprises:

Queries Per Second, abbreviated as QPS, that is able to be borne under different resource amounts and different parameter configurations;

wherein a resource amount comprises a quantity of CPU cores, and a parameter configuration comprises at least one of a quantity of processes, a quantity of threads, a synchronous mode, or an asynchronous mode.

6. The method of claim 2, wherein performing runtime environment performance test based on the baseline version of the inference service, comprises: performing, through a heuristic search algorithm, the runtime environment performance test, based on the baseline version of the inference service;

wherein the heuristic search algorithm evaluates each searched position by means of a search in a state space to obtain a best position, and then conduct a search from the best position until a target is reached.

7. The method of claim 3, wherein performing runtime environment performance test based on the baseline version of the inference service, comprises: performing, through a heuristic search algorithm, the runtime environment performance test, based on the baseline version of the inference service;

wherein the heuristic search algorithm evaluates each searched position by means of a search in a state space to obtain a best position, and then conduct a search from the best position until a target is reached.

8. The method of claim 4, wherein performing runtime environment performance test based on the baseline version of the inference service, comprises: performing, through a heuristic search algorithm, the runtime environment performance test, based on the baseline version of the inference service;

wherein the heuristic search algorithm evaluates each searched position by means of a search in a state space to obtain a best position, and then conduct a search from the best position until a target is reached.

9. The method of claim 5, wherein performing runtime environment performance test based on the baseline version of the inference service, comprises: performing, through a heuristic search algorithm, the runtime environment performance test, based on the baseline version of the inference service;

wherein the heuristic search algorithm evaluates each searched position by means of a search in a state space to obtain a best position, and then conduct a search from the best position until a target is reached.

10. The method of claim 2, further comprising at least one of:

obtaining time consuming of the model at each stage of a query processing flow of the inference service, wherein the query processing flow comprises at least pre-processing, inference, and post-processing;

obtaining, according to the time consuming at each stage, process time consuming in each layer of a deep neural network and/or process time consuming of each operator; or generating, according to the process time consuming in each layer of the deep neural network and/or the process time consuming of each operator, a performance report.

11. The method of claim 3, further comprising at least one of:

obtaining time consuming of the model at each stage of a query processing flow of the inference service, wherein the query processing flow comprises at least pre-processing, inference, and post-processing;

obtaining, according to the time consuming at each stage, process time consuming in each layer of a deep neural network and/or process time consuming of each operator; or generating, according to the process time consuming in each layer of the deep neural network and/or the process time consuming of each operator, a performance report.

12. The method of claim 4, further comprising at least one of:

obtaining time consuming of the model at each stage of a query processing flow of the inference service, wherein the query processing flow comprises at least pre-processing, inference, and post-processing;

obtaining, according to the time consuming at each stage, process time consuming in each layer of a deep neural network and/or process time consuming of each operator; or generating, according to the process time consuming in each layer of the deep neural network and/or the process time consuming of each operator, a performance report.

13. The method of claim 6, further comprising at least one of:

obtaining time consuming of the model at each stage of a query processing flow of the inference service, wherein the query processing flow comprises at least pre-processing, inference, and post-processing;

obtaining, according to the time consuming at each stage, process time consuming in each layer of a deep neural network and/or process time consuming of each operator; or generating, according to the process time consuming in each layer of the deep neural network and/or the process time consuming of each operator, a performance report.

14. The method of claim 1, further comprising at least one of:

removing the inference service that has been deployed at the deployment end from the deployment end; or adjusting a traffic proportion of queries for each version of the inference service, in a case where the deployment end includes coexisting of multiple versions of the inference service.

15. The method of claim 14, wherein updating the inference service that has been deployed at the deployment end, comprises:

allowing a new version of the inference service that has been deployed at the deployment end to gradually replace an old version of the inference service that has been deployed at the deployment end according to a traffic percentage.

16. An electronic device, comprising:

at least one processor; and a memory connected in communication with the at least one processor, wherein the memory stores an instruction executable by the at least one processor, and the instruction, when executed by the at least one processor, enables the at least one processor to execute:

obtaining performance information of a runtime environment of a deployment end, wherein the performance information of the runtime environment comprises query time consuming at different quantile levels;

selecting, according to the performance information of the runtime environment of the deployment end, a target version of an inference service from a plurality of candidate versions of the inference service of a model;

deploying the target version of the inference service to the deployment end, by:

determining a resource amount corresponding to the target version of the inference service and a configuration parameter corresponding to the inference service;

determining a quantity of copies and an external access address of the target version of the inference service; and launching the target version of the inference service online to the deployment end, based on the resource amount corresponding to the target version of the inference service, the configuration parameter corresponding to the inference service, the quantity of copies and the external access address;

updating the inference service that has been deployed at the deployment end, by:

updating a new version of the inference service that has been deployed at the deployment end by a specified quantity of copies in a rolling manner, to gradually replace an old version of the inference service that has been deployed at the deployment end;

performing data collection for the inference service that has been deployed at the deployment end, to obtain statistical information of a runtime effect of the model, wherein the statistical information comprises at least one of: a query data distribution offset of the model in different periods of a model runtime environment, a data distribution offset of the model between query data in the model runtime environment and model training data, or a comparison result of the model between an output result in the model runtime environment and a labeling result; and judging, according to the statistical information, whether the model is suitable for the model runtime environment.

17. A non-transitory computer-readable storage medium storing a computer instruction thereon, wherein the computer instruction is configured to cause a computer to execute:

obtaining performance information of a runtime environment of a deployment end, wherein the performance information of the runtime environment comprises query time consuming at different quantile levels;

selecting, according to the performance information of the runtime environment of the deployment end, a target version of an inference service from a plurality of candidate versions of the inference service of a model;

deploying the target version of the inference service to the deployment end, by:

determining a resource amount corresponding to the target version of the inference service and a configuration parameter corresponding to the inference service;

determining a quantity of copies and an external access address of the target version of the inference service; and launching the target version of the inference service online to the deployment end, based on the resource amount corresponding to the target version of the inference service, the configuration parameter corresponding to the inference service, the quantity of copies and the external access address;

updating the inference service that has been deployed at the deployment end, by:

updating a new version of the inference service that has been deployed at the deployment end by a specified quantity of copies in a rolling manner, to gradually replace an old version of the inference service that has been deployed at the deployment end;

performing data collection for the inference service that has been deployed at the deployment end, to obtain statistical information of a runtime effect of the model, wherein the statistical information comprises at least one of: a query data distribution offset of the model in different periods of a model runtime environment, a data distribution offset of the model between query data in the model runtime environment and model training data, or a comparison result of the model between an output result in the model runtime environment and a labeling result; and judging, according to the statistical information, whether the model is suitable for the model runtime environment.

\* \* \* \* \*